United States Patent [19]

Bellows et al.

[11] Patent Number: 5,081,598
[45] Date of Patent: Jan. 14, 1992

[54] METHOD FOR ASSOCIATING TEXT IN AUTOMATIC DIAGNOSTIC SYSTEM TO PRODUCE RECOMMENDED ACTIONS AUTOMATICALLY

[75] Inventors: James C. Bellows, Maitland; Karl E. Harper, Winter Park, both of Fla.

[73] Assignee: Westinghouse Electric Corp., Pittsburgh, Pa.

[21] Appl. No.: 313,265

[22] Filed: Feb. 21, 1989

[51] Int. Cl.⁵ .............................................. G06F 15/18
[52] U.S. Cl. ..................................... 364/550; 364/186; 395/911
[58] Field of Search ................ 364/513, 900, 200, 550, 364/186

[56] References Cited

U.S. PATENT DOCUMENTS

| | | | |
|---|---|---|---|
| 4,644,479 | 2/1987 | Kemper et al. | 364/550 |
| 4,649,515 | 3/1987 | Thompson et al. | 364/513 |
| 4,763,277 | 8/1988 | Ashford et al. | 364/513 |
| 4,866,635 | 9/1989 | Kahn et al. | 364/513 |
| 4,910,691 | 3/1990 | Skeivik | 364/513 |
| 5,012,430 | 4/1991 | Sakurai | 364/513 |

OTHER PUBLICATIONS

David D. Ardayfio et al, Prototype Expert Systems for Engineering Design and Manufacturing Automation, 1/1987, p. 209.
Robert L. Moore, Expert System in On-Line Process Control Received by U.S. Pat. Office, Jun. 14, 1988, see all.

*Primary Examiner*—Michael R. Fleming
*Assistant Examiner*—Ayaz R. Sheikh

[57] ABSTRACT

A method for automatically generating recommended actions in response to a diagnosis uses a list ordered by impact of the actions. The list is evaluated using required evidence which must be supported by data and assumed evidence which must not be contradicted by the data. The method is applied to the diagnosis of malfunctions in equipment by an expert system rulebase. A correspondence is defined between text modules including the recommended actions and each of the schemata in the rulebase which produce a diagnosis. After a diagnosis is evaluated as true, the corresponding text modules are evaluated to produce a recommended action. The text modules can also be used for documentation of the rulebase.

14 Claims, 2 Drawing Sheets

METHOD FOR ASSOCIATING TEXT IN AUTOMATIC DIAGNOSTIC SYSTEM TO PRODUCE RECOMMENDED ACTIONS AUTOMATICALLY

BACKGROUND OF THE INVENTION

1. Field of the Invention

The present invention is directed to a method of automatically producing recommended actions in response to a diagnosis of malfunctioning equipment and, more particularly, to a method for associating text with rules or schemata in an expert system rulebase to automatically output a description of equipment condition and recommended actions, included in the text, when the corresponding rules are evaluated as being true.

2. Description of the Related Art

There are many known automatic diagnostic systems. Many of these systems use an expert system rulebase to evaluate data output by sensors connected to equipment. For example, U.S. patent application Ser. No. 156,064, filed Feb. 16, 1988, incorporated herein by reference, is directed to an automated system to prioritize repair of plant equipment. This system performs diagnostics on equipment, such as a turbine generator in an electrical power plant or the chemical characteristics of fluid in a nuclear reactor, by determining a level of severity and a confidence factor that the diagnosed condition exists. This system lists diagnosed malfunctions by severity of the malfunction. An operator of this system uses the diagnosed malfunction, including level of severity and confidence factor to manually select a recommended action from a predefined list. This recommended action can then be followed to correct or avoid further damage from the diagnosed malfunction.

In addition to the dependence upon manual steps, this system has a drawback in that the ordering of recommendations directly corresponds to the ordering of diagnoses, i.e., by severity of the diagnosed malfunction to the operation of the plant. No other ordering of the recommended actions is possible. Furthermore, no attempt is made to use other data to select the "best" action based upon other criteria.

SUMMARY OF THE INVENTION

An object of the present invention is to provide a method to automatically select a recommended action from an ordered list.

Another object of the present invention is to provide a method for defining a correspondence between one diagnosis and multiple recommended actions which are distinguished by criteria other than the severity and confidence factor of the diagnosis.

Yet another object of the present invention is to provide a method for choosing items in an ordered list using both required and assumed evidence.

A further object of the present invention is to provide a method for associating text with schemata in an expert system rulebase in such a manner that the text can be operated on independently or in conjunction with the schemata in the expert system rulebase.

A yet further object of the present invention is to provide a method for associating schemata in an expert system rulebase with text that can be used for both documentation of the expert system and explanatory output of data evaluated by the expert system.

The above objects are attained by providing a method of automatically determining a recommended action in response to diagnosis of a malfunction in equipment, comprising the steps of producing a diagnosis, having recommended actions associated therewith, in dependence upon a first set of evidence of conditions currently existing in the equipment and selecting one of the recommended actions associated with the diagnosis in dependence upon a second set of evidence of conditions, different from the first set of evidence, both required and assumed evidence being includable in the second set of evidence. Preferably, a correspondence is predefined between each possible diagnosis and a recommended action set including at least one action. The actions in each recommended action set are preferably ordered by the severity of impact on the equipment caused by carrying out the actions, ordered from least impact to greatest impact. The selection criteria is thus used to select the action with the least severe effect of all actions in the recommended actions set corresponding to a malfunction diagnosis produced by applying an expert system rulebase to data on condition of the equipment.

These objects together with other objects and advantages which will be subsequently apparent, reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENTS

As described above, some expert systems used for diagnosing malfunctioning equipment require a manual step to produce the recommended action to be taken. In addition to relying upon manual steps, the resulting recommended actions are sorted by severity of the malfunction and no consideration is given to the impact of the recommended action on the equipment. In addition, there is typically no distinction between conditions which must be known to be present (required evidence) and conditions which may be assumed to be present (assumed evidence). The present invention overcomes these drawbacks by using the method illustrated in FIG. 1.

Figure 1:
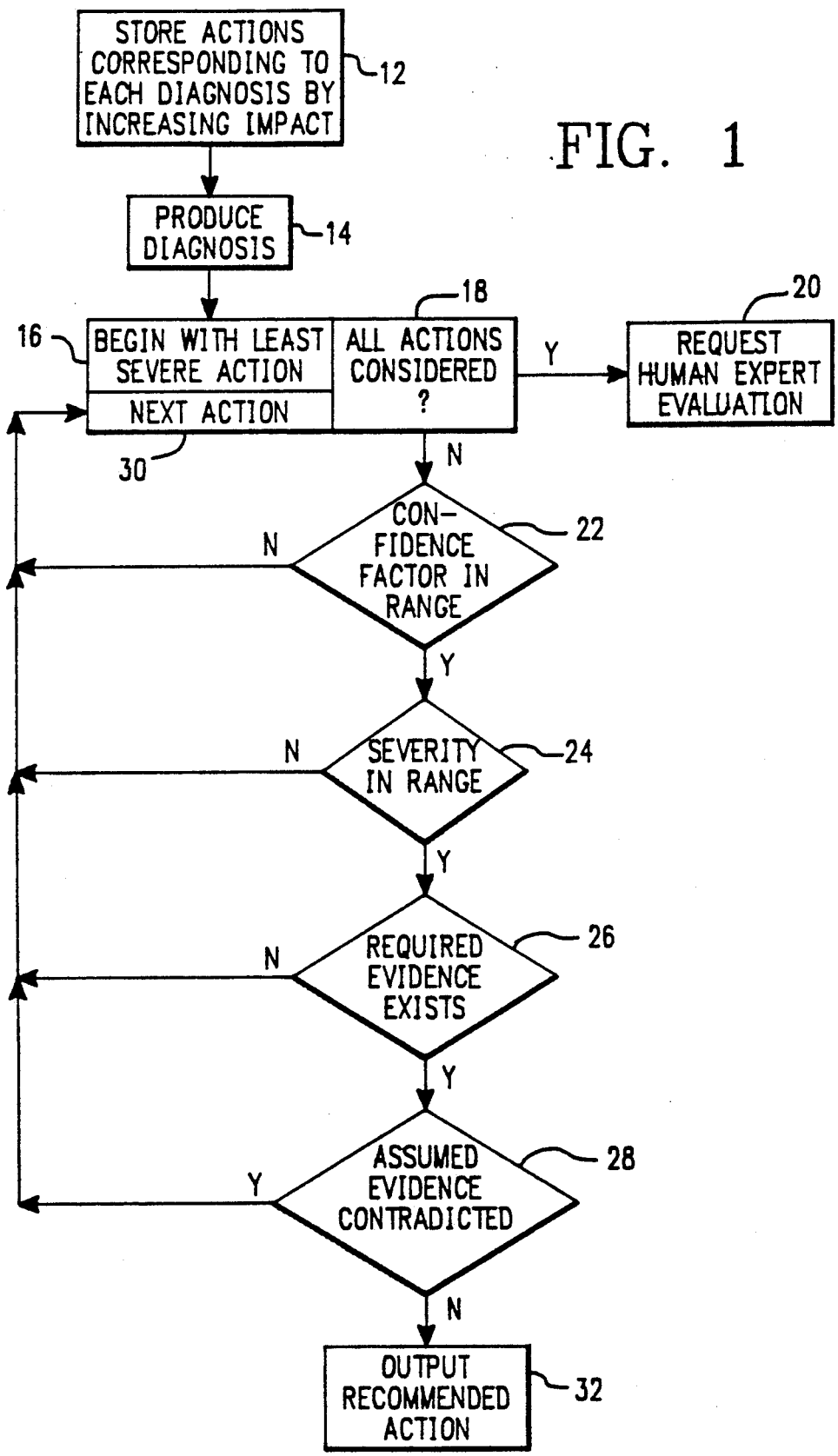
FIG. 1 is a flowchart of a method according to the present invention.

In order to automatically output recommended actions, it is necessary to first store 12 the actions which could be recommended and provide a correspondence between each of the diagnoses which the expert system can produce and a recommended action set including at least one action. As indicated in FIG. 1, the actions in each recommended action set are preferably stored in an order determined by increasing impact of the actions. Factors to be taken into account in determining the severity of the impact include the difficulty of taking the action while keeping the equipment running or the length of time the equipment will be shut down in order to take the action.

After the actions have been stored, the expert system rulebase can be used to produce a diagnosis 14 by evaluating data representing conditions in the equipment. In a conventional manner, each diagnosis requires that a set of evidence of conditions be indicated by the data. Also in a conventional manner, evaluation of the data includes generating a confidence factor indicative of confidence in the accuracy of the diagnosis. Some diagnoses will have a single possible action to be taken in response. In this case, there will be a one-to-one correspondence between the diagnosis and the recommended action. Of course some actions may be appropriate for more than one diagnosis and therefore duplications of actions can be avoided by providing a correspondence between that action and several diagnoses.

For those diagnoses which have more than one possible recommended action, it is necessary to compare the data representing actual conditions associated with the equipment to sets of evidence corresponding to the possible actions. Preferably, this process begins 16 with the least severe action and continues until an appropriate action is selected in the manner described below. If all of the actions have been considered 18 without any being selected, the last resort action of requesting evaluation 20 by a human expert is used.

The way in which the data is evaluated in using the sets of evidence may vary from one diagnostic system to another, depending upon the software used, e.g., commercially available expert system shell, custom expert system, or other software, and the type of equipment or domain of the diagnostic system. The preferred embodiment uses an expert system with a domain of diagnosing an item of equipment, but the present invention is applicable to other domains and other software as well.

The evidence used in the preferred method includes determining 22 whether the confidence factor is within a range defined for the corresponding action and whether 24 the severity is similarly within a predefined range. In addition, other evidence which may be unrelated to the diagnosis may be required to exist 26 or assumed to exist. If the assumed evidence is contradicted 28, even if all of the other evidence is present, similar tests will be applied to the set of evidence corresponding to the next action 30. If all of the tests 22, 24, 26 and 28 are met successfully, a recommended action is output 32.

An example of how the method illustrated in FIG. 1 can be applied will be described below. First, a description will be provided of one method for defining the correspondence between schemata in an expert system rulebase and text modules which may include recommended actions. The diagram illustrated in FIG. 2 will be used to assist in this description.

Figure 2:
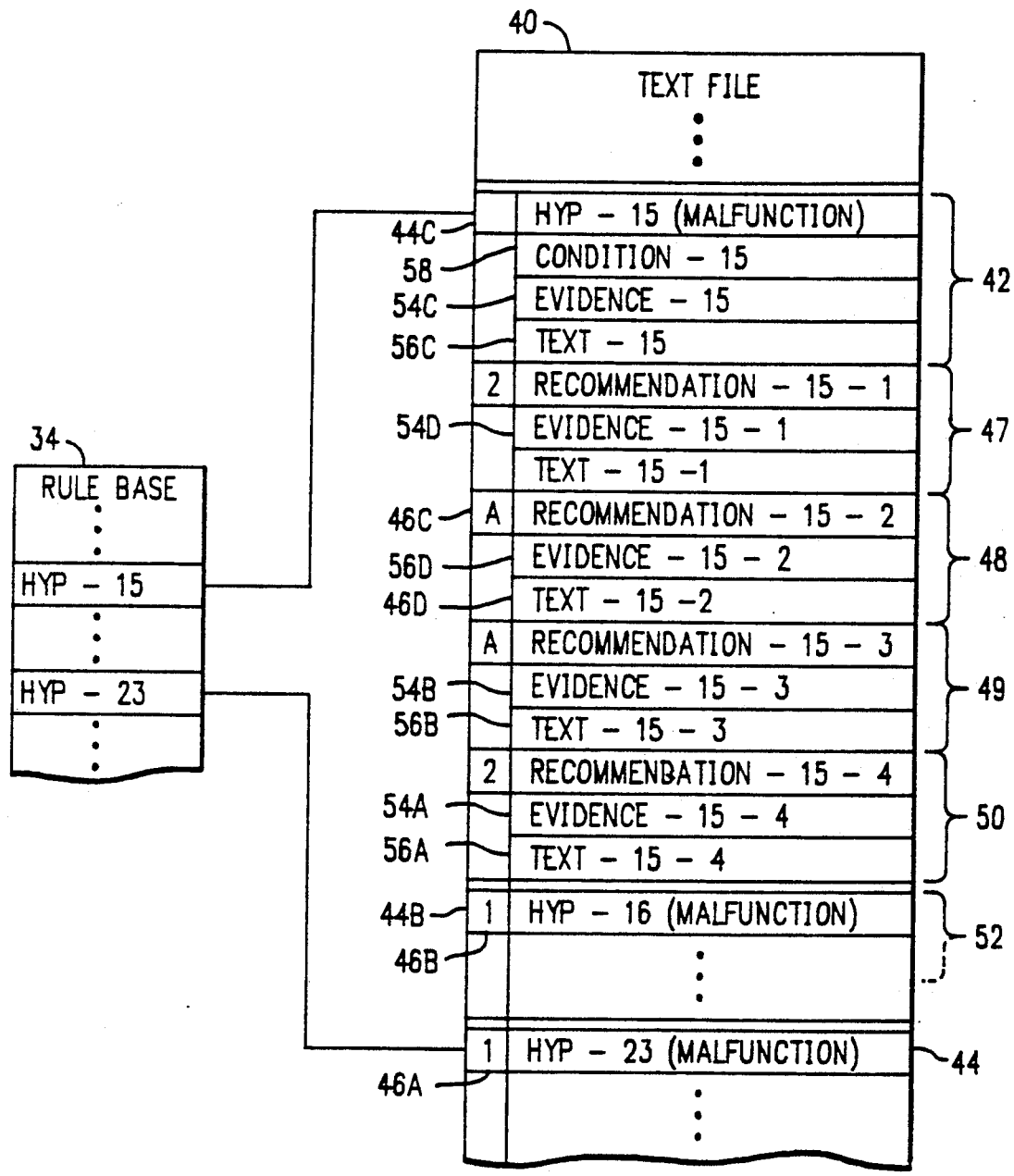
FIG. 2 is a block diagram illustrating correspondence between rules in a rulebase and text modules.

An expert system rulebase 34 conventionally includes a number of rules, hypotheses, variables, etc., which together are referred to as schemata (singular: schema) for evaluating data to determine a diagnosis or to identify a selection from some group of items. Terminal hypotheses are called malfunctions or procedures. Typically, the hypotheses are identified in some manner, using a unique name or number. In FIG. 2, the hypotheses are simply numbered for brevity's sake and two malfunction hypotheses, HYP-15, and HYP-23 are specifically illustrated. Expert systems may include anywhere from a couple dozen to hundreds of hypotheses, depending upon the complexity of the domain evaluated by the rulebase.

According to the present invention, a text file 40 stores text modules, e.g., 42 and a correspondence is defined between the hypotheses in the rulebase 34 and the text modules. In the preferred embodiment, this is accomplished by storing a header 44 in each of the text modules to identify the corresponding hypothesis. The header 44 contains a label, e.g., HYP-23 which corresponds to the identification of the corresponding hypothesis in the rulebase 34.

Additional flexibility is provided in the present invention by including a hierarchy number, e.g., 46A in the header 44A. This enables additional text modules, e.g., 47-50 to be associated with a text module 42 corresponding to one of the schema (HYP-15) in the rulebase 34, without requiring the correspondence to be defined in each of the text modules. In the preferred embodiment this is accomplished by use of the hierarchy number 46. For example, text module 47 has a hierarchy number of 2 which is a lower level than the hierarchy number 1 of text module 42. Therefore, text module 47 and text modules 48-50, all of which are assumed to have a hierarchy number indicating a lower level, are associated with text module 42. The header 44B for the text module 52 following text module 50 has a hierarchy number 46B of 1 and thus indicates the end of the text modules associated with HYP-15. Text modules 48 and 49 are indicated as having hierarchy numbers 46C and 46D with a value of A which in the examples described below is either 2 or 3.

As indicated in FIG. 2, each of the text modules includes a header 44, an evidence portion 54 and a text portion 56. In addition, all text modules, such as text module 42, at the highest hierarchy level has a condition portion 58. The condition portion 58 contains text which is used to describe the condition associated with the malfunction schema corresponding thereto. Alternatively, all text modules could be identical and the text portion 56 of the highest-level text modules could be used to store condition text. The evidence portion 54 is used during data evaluation to determine whether the text portion 56 will be displayed. The evidence portion or evidence set 54 of higher level text modules, such as text module 42, is combined with the evidence set of lower level text modules, such as text module 49, in making a determination of whether to output text portion 56B of the lower level text module 49.

For example, in most cases the evidence set associated with the highest level text modules will always be true. Assuming this is the case for text module 42, if the evidence set indicated by EVIDENCE-15-1 in evidence portion 54D of text module 47 is SYSTEM IS RUNNING HOT, and the hierarchy level indicated by A for text modules 48 and 49 is 3, the evidence set indicated by EVIDENCE-15-3 in evidence portion 54B of text module 49 may be AIR FLOW IS LOW. In this case, the text indicated by TEXT-15-3 in text portion 56B of text module 49 will be output, not every time the air flow is low, but only if the air flow is low and the system is running hot.

A specific example of how it is determined to output a recommended action will now be provided where the evidence sets and texts stored in the text file 40 are as indicated in table I below.

TABLE I

| | |
|---|---|
| RULE-15(malfunction) | (label) |
| CONDITION-15 | (Excessive air inleakage) |
| EVIDENCE-15 | (blank, i.e., always TRUE) |
| TEXT-15 | (blank) |
| RECOMMENDATION-15-1 | (label) |
| EVIDENCE-15-1 | $0.3 <$ confidence factor $< 0.7$ AND $0.0 <$ severity $< 0.5$ AND MONITOR-CALIBRATION |

TABLE I-continued

| | |
|---|---|
| TEXT-15-1 | NOT RECENT<br>Check air exhaust & condensate oxygen monitors for accuracy |
| RECOMMENDATION-15-2 | (label) |
| EVIDENCE-15-2 | 0.5 < confidence factor < 1.0 AND severity > 0.25 AND pH < 9.2 AND (NOT UPDATED (PUMP-MAX-STROKE) OR NOT PUMP-MAX-STROKE) |
| TEXT-15-2 | Increase hydrazine feed rate |
| RECOMMENDATION-15-3 | (label) |
| EVIDENCE-15-3 | 0.75 < confidence factor < 1.0 AND severity > 1.0 AND (NOT UPDATED (pH) OR pH > 9.2) |
| TEXT-15-3 | Fix air in leakage within next 24 hours or shut down |
| RECOMMENDATION-15-4 | (label) |
| EVIDENCE-15-4 | (blank, i.e., always TRUE) |
| TEXT-15-4 | Call for human recommendation |

In the first example, it will be assumed that the hierarchy number A in text modules 48 and 49 is 2 and the diagnosis of excessive air inleakage has been evaluated as true with a confidence factor of 0.75 and a severity of 1.25 with a pH of 9.4 Further, it will be assumed that there is no recent data to indicate whether the pump is at maximum stroke. Using the method illustrated in FIG. 1, the first action RECOMMENDATION-15-1 is evaluated and it is determined 22 that the confidence factor is outside of the range. Therefore, the second action RECOMMENDATION-15-2 is considered and the confidence factor 22 and severity 24 are determined to be within range, but the required evidence of pH<9.2 does not exist 26. Therefore, the third action RECOMMENDATION-15-3 is evaluated. As for the second action, the confidence factor and severity are within range. In addition, the assumed evidence that pH is >9.2 is not contradicted. Therefore, TEXT-15-3 is output, as it would be if there was no recent data for pH.

As a second example, if the severity value is determined to be lower, e.g., 0.75 due to a different amount of condensate oxygen, for example, the confidence factor and severity will not be in range for any of the evidence sets 15-1, 15-2 or 15-3. Therefore, TEXT-15-4 will be output to call for a human recommendation because EVIDENCE-15-4 is always true. As indicated in FIG. 1, the request for human expert evaluation 20 is preferably included as a last resort in case not all permutations of evidence are included in the preceding evidence sets.

As another example, the hierarchy number, represented by A in FIG. 2, of text modules 48 and 49 is assumed to be 3. For this example, text module 42 will be assumed to include only a header 44C and a condition description 58 and text module 47 will be assumed to include only a header with EVIDENCE-15-1 and TEXT-15-1 left blank. The evidence sets 54E and 54B of text modules 48 and 49 are assumed to be mutually exclusive so that the last resort of human evaluation 20 is unnecessary. Thus, when the diagnosis corresponding to malfunction HYP-15 is produced, either TEXT-15-2 or TEXT-15-3 will be output.

In this embodiment, the evidence set of all text modules is evaluated. Therefore, evaluation of the text modules associated with malfunction HYP-15 does not end with the output of one of the text portions 56D and 56B of text modules 48 and 49. It will be assumed that the evidence set EVIDENCE-15-4 in evidence portion 54A of text module 50 is also blank so that the text portion 56A is always output. In this embodiment, the last text module associated with a hypothesis has a hierarchy level of level 2 and the text portion 56, in this case TEXT-15-4, contains a description of the consequence of inaction. The content of TEXT-15-4 is essentially a prognosis of the condition diagnosed by the associated malfunction hypothesis. Thus, the description of the consequence of inaction is output regardless of which of the actions (48 or 49) is selected from the recommended action set corresponding to the diagnosed hypothesis (HYP-15). If the hypothesis has several possible levels of severity, there may be more than one text module containing a consequence of inaction with different evidence sets each requiring a different level of severity and each having a different consequence of inaction.

There are numerous modifications which can be made to the disclosed embodiment without departing from the present invention. For example, it has been assumed that the diagnosis is arrived at by evaluating an expert system rulebase for a piece of equipment. However, according to the present invention a list of recommended actions in response to a specific situation, which has been ordered by increasing impact on the domain or environment in which the situation has occurred, can be evaluated according to the present invention to select the least severe impact. Similarly, while it is preferred to use a separate file 4σ associated with a rulebase 34, it is possible to use a conventional expert system shell to evaluate rules ending with the printing of the text of a recommended action. This is considerably more cumbersome in a domain where there are many possible recommended actions for a single diagnosis.

Also, the text file 40 can be maintained in several different ways. For example, the text file is preferably made accessible for editing substantially concurrently with editing of the schemata in the rulebase 34. Alternatively, or in addition, the text file 40 may be accessible for editing of the text modules independently of the schemata in the rulebase 34. This access may include the ability to output any or all of the text modules when data is not being evaluated.

Both types of access to the text file 40, discussed above, can be provided. Preferably, whenever one of the schemata is edited without a corresponding text module in existence, a new text module, including the header therefor, is automatically generated. This provides documentation for modifications to the rulebase. Additional documentation can be provided for schemata and hypotheses which are not diagnoses by making use of the text portion 56 of the corresponding text module and, e.g., setting the evidence portion 54 to always be false, if necessary to prevent output. A similar text module can be included in a recommended action set corresponding to a schema for the purpose of, e.g., describing changes to the schema or the recommended actions for documentation purposes, rather than as text to be output as a recommended action.

The many features and advantages of the invention are apparent from the detailed specification and thus, it is intended by the appended claims to cover all such features and advantages of the invention which fall within the true spirit and scope thereof. Further, since numerous modifications and changes will readily occur to skilled in the art, it is not desired to limit the invention to the exact construction and operation illustrated and described, accordingly, all suitable modifications and equivalents may be resorted to, falling within the scope and spirit of the invention.

What is claimed is:

1. A method of automatically determining a recommended action in response to diagnosis of a malfunction in equipment, comprising the steps of:
   (a) defining a correspondence between each possible diagnosis and a recommended action set including at least one action
   (b) producing a diagnosis, having recommended actions associated therewith, in dependence upon a first set of evidence of conditions currently existing in the equipment; and
   (c) selecting, using a computerized process, one of the recommended actions in the recommended action set corresponding to the diagnosis produced in step (b) in dependence upon a second set of evidence of conditions, different from the first set of evidence, both required and assumed evidence being includable in the second set of evidence, using a computerized process including the steps of
      (c1) comparing data representing actual conditions associated with the equipment being diagnosed to the second set of evidence; and
      (c2) determining an appropriate action when the data indicates that the conditions corresponding to any required evidence exist and any assumed evidence is uncontradicted by the data.

2. A method as recited in claim 1,
   further comprising the step of (d) designating, when the at least one action in the recommended action set includes a plurality of actions, an order for the actions determined by impact of the actions on the equipment, and
   wherein said comparing in step (b1) is performed for the actions in the recommended action set, in the order designated in step (d), whereby the appropriate action determined in step (b2) has a least severe impact on the equipment among the actions in the recommended actions set capable of being selected in step (b2).

3. A method as recited in claim 1, further comprising the step of (d) outputting the one of the recommended actions selected in step (b) and a consequence of inaction.

4. A method as recited in claim 3,
   wherein the recommended action set corresponding to each possible diagnosis includes a single description of the consequence of inaction, and
   wherein step (d) outputs the single description of the consequence of inaction regardless of which of the actions in the recommended action set is selected in step (b).

5. A method of associating text with schemata in a rulebase of an expert system for a evaluating data using the schemata in the rulebase, comprising the steps of:
   (a) storing the selection criteria, independent of the schemata in the rulebase, for selecting text modules and a correspondence between the schemata in the rulebase and the text modules,
   (b) diagnosing existing conditions represented by the data in dependence upon the schemata in the rulebase;
   (c) automatically outputting at least one of the text modules in dependence upon the existing conditions diagnosed in step (b) and the correspondence and selection criteria stored in step (a); and
   (d) selectively outputting any of the text modules when said diagnosing in step (b) is not being performed.

6. A method as recited in claim 5, further comprising the step of (e) providing for editing of the text modules substantially concurrently with editing of the schemata in the rulebase.

7. A method as recited in claim 6,
   wherein step (a) comprises storing a header in each of the text modules to identify a corresponding schema, and
   wherein said method further comprises the step of (f) generating automatically a new text module, including the header therefor, whenever one of the schemata is edited without a corresponding text module in existence.

8. A method as recited in claim 6, further comprising the step of (f) providing for editing of the text modules independently of the schemata in the rulebase.

9. A method of associating text with schemata in a rulebase of an expert system for a evaluating data using the schemata in the rulebase, comprising the steps of:
   (a) storing selection criteria, independent of the schemata in the rulebase, for selecting text modules and a correspondence between the schemata in the rulebase and the text modules, including a header in each of the text modules to identify a corresponding schemata;
   (b) diagnosing existing conditions represented by the data in dependence upon the schemata in the rulebase;
   (c) associating an evidence set with each of the text modules; and
   (d) automatically outputting, when the data is being evaluated, at least one of the text modules when the header stored therein identifies the corresponding schemata having been evaluated as true and the evidence set associated therewith is evaluated as true for the data being evaluated.

10. A method as recited in claim 9,
    further comprising the step of (e) storing all of the text modules corresponding to a single one of the schemata together in a hierarchical order defined by a hierarchy number stored in the header of each of the text modules, and
    wherein the selection criteria used in step (c) combines the evidence set of a higher level text module with the evidence set of a lower level text module to determine whether to output the lower level text module.

11. A method as recited in claim 10, wherein the expert system is used to diagnosis malfunctions in equipment and to provide recommendations,
    wherein said method further comprises the step of (f) storing recommendation text in each of the text modules corresponding to a diagnosis hypothesis, and
    wherein step (c) comprises outputting, when evaluating the data, all of the text modules meeting the selection criteria and corresponding to the diagnosis hypothesis evaluated as true.

12. A method as recited in claim 11, wherein the recommendation text in each of the text modules used to provide the recommendations includes at least one of a description of the diagnosis hypothesis corresponding thereto, a recommended action and a consequence of inaction.

13. A method as recited in claim 12, wherein step (e) comprises the steps of:
 (e1) storing the text modules containing the description of the diagnosis hypothesis corresponding thereto at a first hierarchy level; and
 (e2) storing at least two of the text modules containing alternative recommended actions, when more than one action is possible, with different associated evidence sets at a second hierarchy level lower than the first hierarchy level.

14. A method as recited in claim 13, wherein step (c) further comprises the step (e3) storing at least one of the text modules containing the consequence of inaction after all alternative actions for the diagnosis rule corresponding thereto, using either of the first and second hierarchy levels.

* * * * *